United States Patent

Liao (10) Patent No.: US 9,716,429 B2
(45) Date of Patent: Jul. 25, 2017

(54) POWER SUPPLY SYSTEM AND DISPLAY APPARATUS (71) Applicant: Sitronix Technology Corp., Hsinchu County (TW)

(72) Inventor: Min-Nan Liao, Hsinchu County (TW)

(73) Assignee: Sitronix Technology Corp., Hsinchu County (TW)

(*) Notice: Subject to any disclaimer, the term of this patent is extended or adjusted under 35 U.S.C. 154(b) by 243 days.

(21) Appl. No.: 14/819,399

(22) Filed: Aug. 5, 2015

(65) Prior Publication Data

US 2016/0358577 A1 Dec. 8, 2016

(30) Foreign Application Priority Data

Jun. 3, 2015 (TW) .............................. 104117898 A (51) Int. Cl.
*H02M 7/00* (2006.01)
*H02M 3/07* (2006.01)
*H02M 1/36* (2007.01)
*H02M 1/00* (2006.01)

(52) U.S. Cl.
CPC .......... *H02M 3/07* (2013.01); *G09G 2330/02* (2013.01); *H02M 1/36* (2013.01); *H02M 2001/0048* (2013.01); *Y02B 70/1491* (2013.01)

(58) Field of Classification Search
CPC ....................................................... H02M 7/00
See application file for complete search history.

(56) References Cited

U.S. PATENT DOCUMENTS

| 8,339,184 B2* | 12/2012 | Kok | H03K 17/687 327/536 |
| 8,344,791 B2* | 1/2013 | Adkins | H02M 3/07 327/536 |
| 2014/0192094 A1 | 7/2014 | Liao | |

FOREIGN PATENT DOCUMENTS

| CN | 203721167 U | 7/2014 |
| JP | 2014132338 | 7/2014 |
| TW | M480748 | 6/2014 |

* cited by examiner

Primary Examiner — Hai L Nguyen
(74) Attorney, Agent, or Firm — Winston Hsu (57) ABSTRACT A power supply system includes a charging pump module including a plurality of charging pump circuits, wherein each charging pump circuit includes a plurality of transistor switches and is coupled to a flying capacitor set in parallel and the flying capacitor set includes a plurality of flying capacitor units; and a control module for generating a plurality of control signals to switch a connection relationships of the plurality of flying capacitor units; wherein the plurality of charging pump circuits charges the plurality of flying capacitor units and the connection relationships of the plurality of flying capacitor units determines a generation of a charging voltage; an amplifying module for utilizing the charging voltage as a voltage source to generate an amplifying voltage; and a load module for processing a dynamic charging operation in a predetermined period according to the amplifying voltage, to make the load module achieve a predetermined voltage.

11 Claims, 11 Drawing Sheets

POWER SUPPLY SYSTEM AND DISPLAY APPARATUS

BACKGROUND OF THE INVENTION

1. Field of the Invention

The present invention relates to a power supply system and a display apparatus, and more particularly, to a power supply system which processes a dynamic charging operation to shorten a charging period for driving a display apparatus.

2. Description of the Prior Art

Figure 1A:
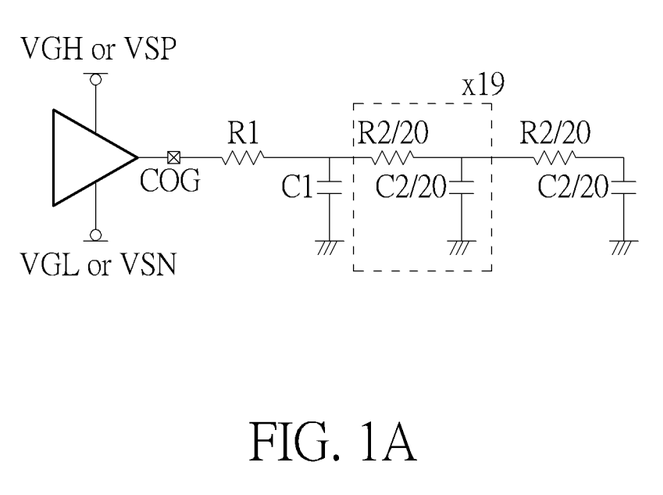
FIG. 1A illustrates a schematic diagram of a conventional load module corresponding to a driving chip.
Figure 1B:
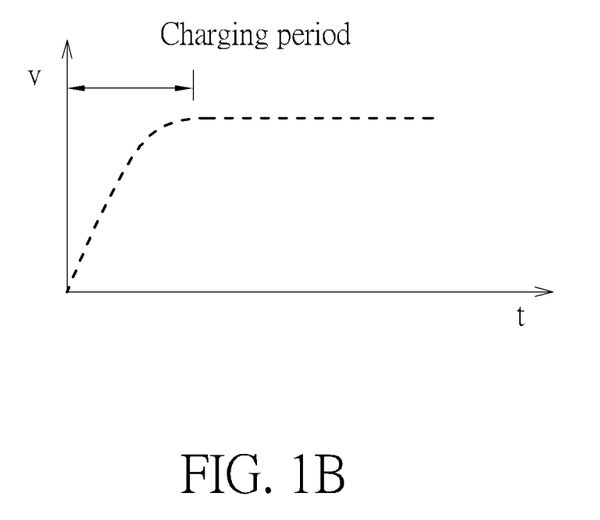
FIG. 1B illustrates a schematic diagram of a load charging period corresponding to a load module shown in FIG. 1A.

During portable electronic devices rapidly developing, thinner products with energy saving and carbon reduction are much more popular in the market. For example, flexible printed circuit boards (PCBs) in the thin film transistor liquid crystal display (TFT LCD) are installed multiple passive elements, e.g. capacitors or diodes. For the purpose of pursuing thinner and lighter products to effectively reduce the size of the flexible PCBs, these passive elements are designed to be disposed/moved inside a driving chip of the TFT LCD, and a load module corresponding to the driving chip is demonstrated as a resistor-capacitor model shown in FIG. 1A. When the load module forms as a gate type, a capacitance value is around 20 pF; when the load module forms as a source type, a capacitance value is around 30-60 pF, wherein both types of the load modules with different capacitance values correspond to a load charging period shown in FIG. 1B.

Figure 2A:
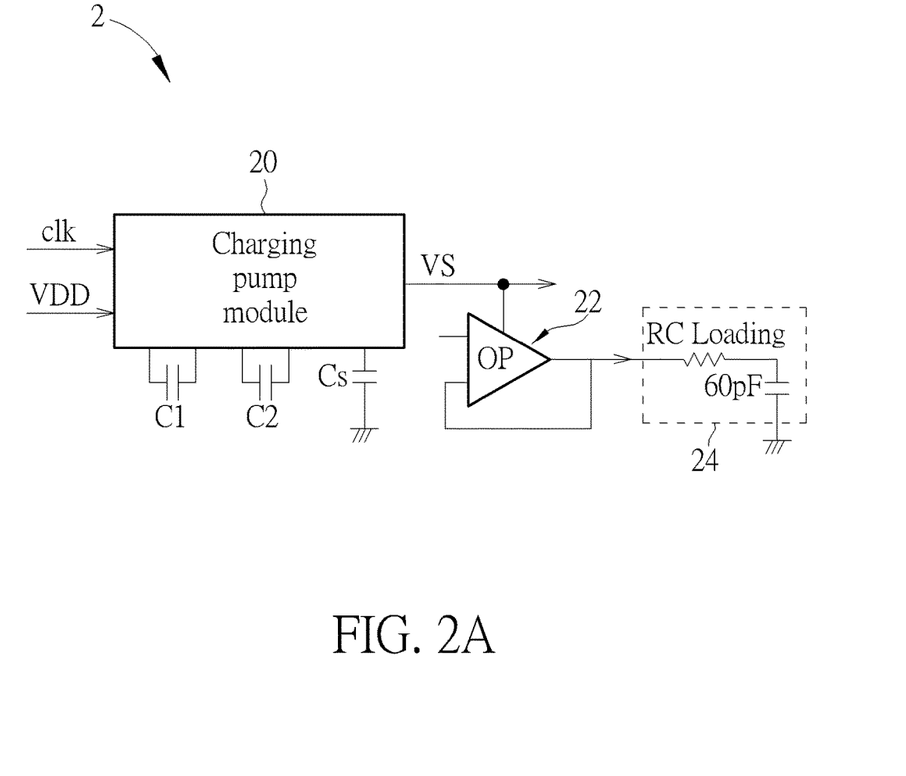
FIG. 2A illustrates a schematic diagram of a conventional two-times-voltage charging pump power supply system.
Figure 2B:
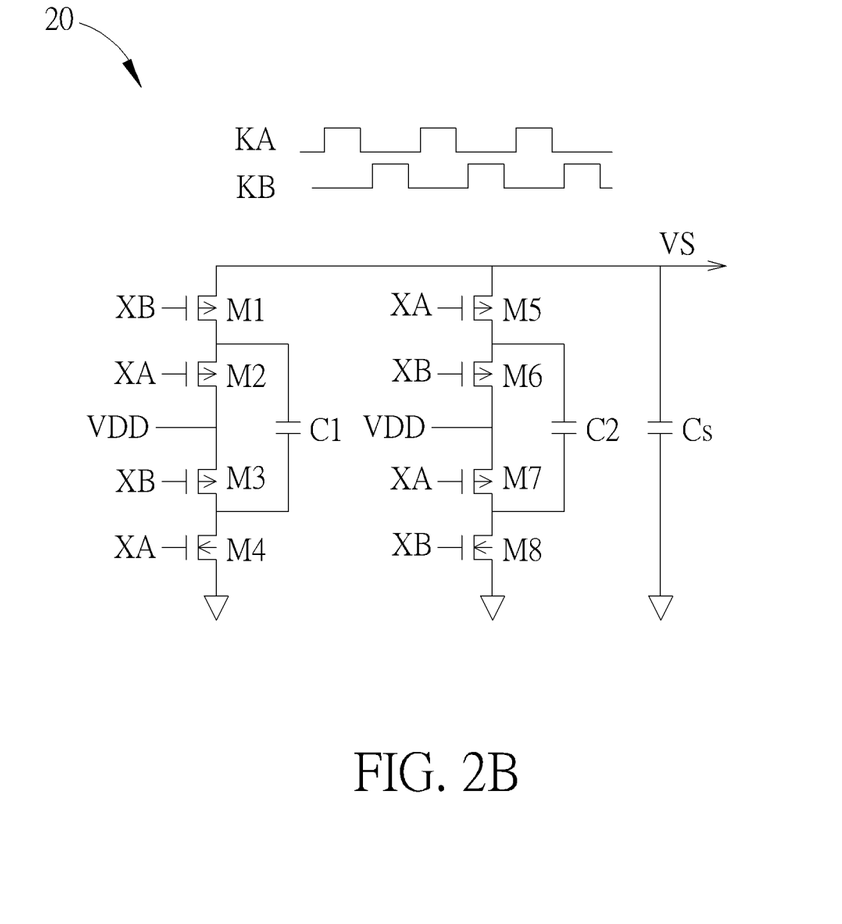
FIG. 2B is a schematic diagram of a charging pump module in FIG. 2A.

Please refer to FIG. 2A and FIG. 2B, wherein FIG. 2A illustrates a schematic diagram of a conventional two-times-voltage charging pump power supply system 2, and FIG. 2B is a schematic diagram of a charging pump module 20 in FIG. 2A. As shown in FIG. 2A and FIG. 2B, the two-times-voltage charging pump power supply system 2 comprises a charging pump module 20, an amplifying module 22 and a load module 23 (such as an equivalent load circuit of a display panel), and the charging pump module 20 comprises transistor switches M1-M8, flying capacitor units C1 and C2 and a storage capacitor Cs. Preferably, the charging pump module 20 utilizes conduction signals KA, KB, XA (an inversion signal of KA) and XB (an inversion signal of KB) to correspondingly conduct the transistor switches M1-M8 and utilizes a voltage VDD for charging the flying capacitor units C1 and C2, so as to output a charging voltage VS. Further, the amplifying module 22 is operated to amplify a voltage source, such as the charging voltage VS, to be outputted as an amplifying voltage, and the amplifying voltage is transmitted to the load module 24 to process the charging operation for the equivalent resistor-capacitor circuit.

However, in the prior art, the flying capacitor units C1 and C2 or the storage capacitor Cs have fixed capacitance values. If a user utilizes an elevated clock signal clk for shortening a charging period, the charging pump module 20 may continuously output an exceeding charging current to charge the equivalent resistor-capacitor circuit via the elevated clock signal clk while the equivalent resistor-capacitor circuit of the load module 24 is almost to finish the charging operation within the load charging period, which may violate the purpose of energy saving. If the user lowers the clock signal clk, the fixed capacitance values of the flying capacitor units C1 and C2 and the storage capacitor Cs may result in more generation of noises of the charging voltage VS, to significantly disturb an output voltage level of the charging voltage VS.

Therefore, it has become an important issue to provide another circuit designs for the conventional charging pump module, to adaptively turn on or turn off a plurality of flying capacitor units in the charging pump module, so as to output an adjustable charging voltage for adaptively shortening the load charging period.

SUMMARY OF THE INVENTION

Therefore, the primary objective of the present invention is to provide another circuit designs for the conventional charging pump module, to adaptively turn on or turn off a plurality of flying capacitor units in the charging pump module.

The present invention discloses power supply system. The power supply system comprises a charging pump module, comprising a first charging pump circuit, coupled to a first flying capacitor set in parallel and comprising a first transistor switch set, wherein the first flying capacitor set comprises a plurality of first flying capacitor units coupled to each other in parallel; a second charging pump circuit, coupled to a second flying capacitor set in parallel and comprising a second transistor switch set, wherein the second flying capacitor set comprises a plurality of second flying capacitor units coupled to each other in parallel; and a control module, coupled to the first flying capacitor set and the second flying capacitor set, for generating a plurality of control signals to switch a connection relationships of the plurality of first flying capacitor units and the plurality of second flying capacitor units; wherein the first charging pump circuit and the second charging pump circuit process a charging operation for the plurality of first flying capacitor units and the plurality of second flying capacitor units according to a plurality of conduction signals, to generate a charging voltage according to the connection relationships of the plurality of first flying capacitor units and the plurality of second flying capacitor units; an amplifying module, coupled to the charging pump module, for utilizing the charging voltage as a voltage source to generate an amplifying voltage; and a load module, coupled to the amplifying module, for processing a dynamic charging operation in a predetermined period according to the amplifying voltage, to make the load module achieve a predetermined voltage.

The present invention further discloses a display apparatus. The display apparatus comprises a display panel, comprising an equivalent load resistor and an equivalent load capacitor; and a power supply system, coupled to the equivalent load resistor and the equivalent load capacitor of the display panel. The power supply system comprises a charging pump module, comprising a first charging pump circuit, coupled to a first flying capacitor set in parallel and comprising a first transistor switch set, wherein the first flying capacitor set comprises a plurality of first flying capacitor units coupled to each other in parallel; a second charging pump circuit, coupled to a second flying capacitor set in parallel and comprising a second transistor switch set, wherein the second flying capacitor set comprises a plurality of second flying capacitor units coupled to each other in parallel; and a control module, coupled to the first flying capacitor set and the second flying capacitor set, for generating a plurality of control signals to switch a connection relationships of the plurality of first flying capacitor units and the plurality of second flying capacitor units; wherein the first charging pump circuit and the second charging pump circuit process a charging operation for the plurality of first flying capacitor units and the plurality of second flying capacitor units according to a plurality of conduction signals, to generate a charging voltage according to the connection relationships of the plurality of first flying capacitor units and the plurality of second flying capacitor units; and an amplifying module, coupled to the charging pump module, for utilizing the charging voltage as a voltage source to generate an amplifying voltage; wherein the power supply system processes a dynamic charging operation in a predetermined period according to the amplifying voltage, to make the display panel achieve a predetermined voltage for initiating a display operation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in sub-module. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 3A:
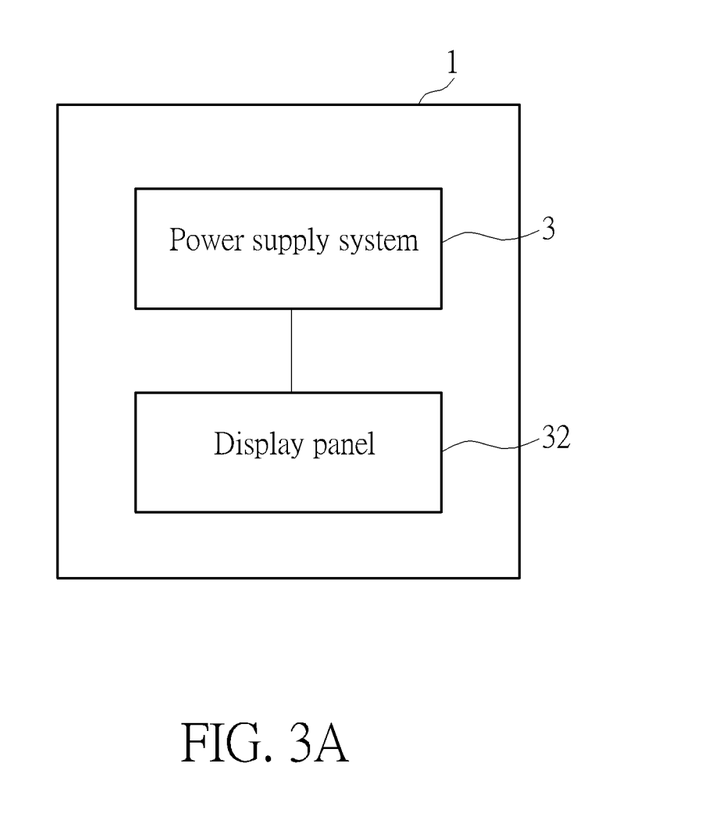
FIG. 3A illustrates a schematic diagram of a display apparatus according to an embodiment of the invention.
Figure 3B:
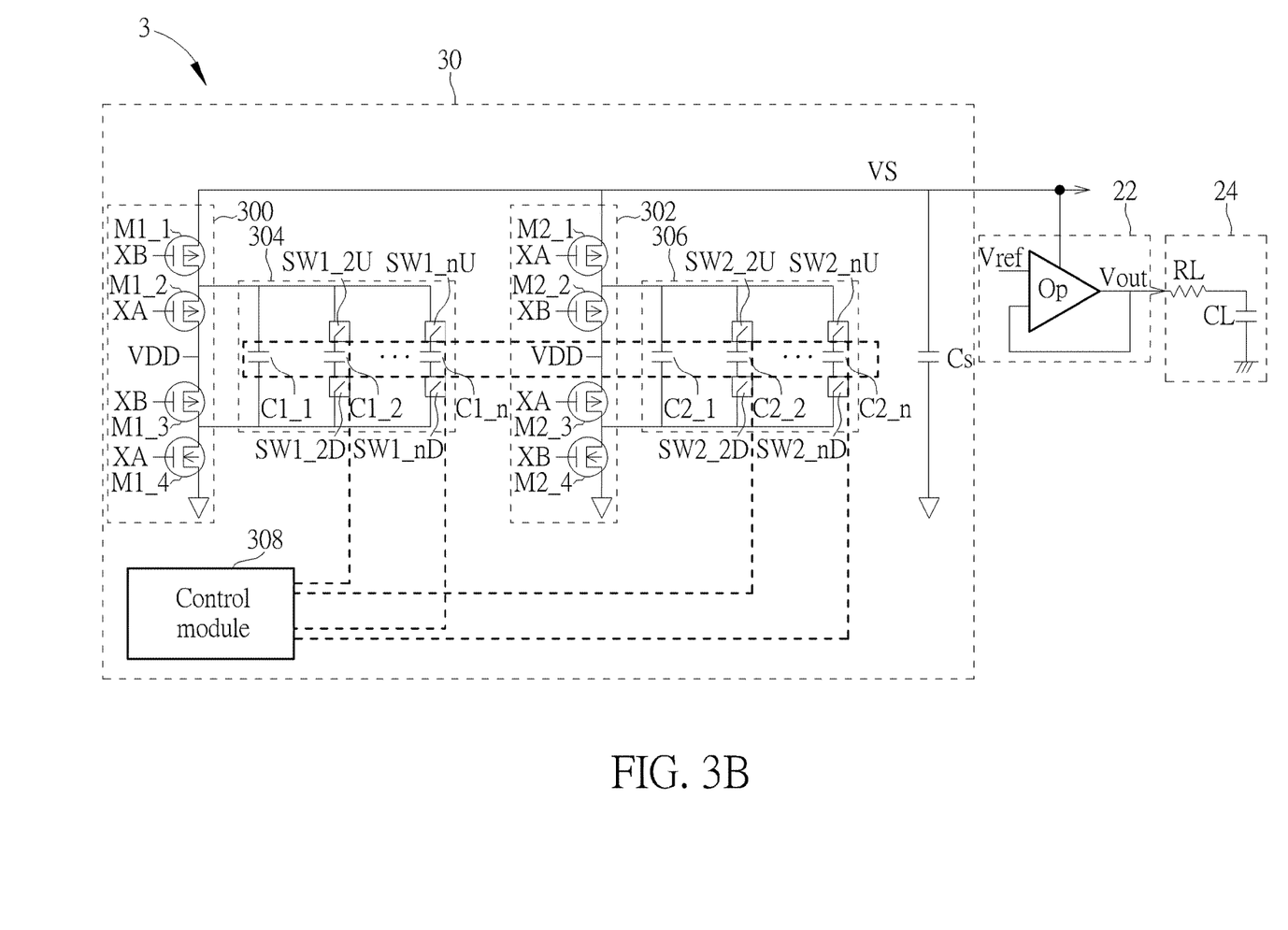
FIG. 3B illustrates a schematic diagram of a power supply system according to an embodiment of the invention.

Please refer to FIG. 3A and FIG. 3B, wherein FIG. 3A illustrates a schematic diagram of a display apparatus 1 according to an embodiment of the invention, and FIG. 3B illustrates a schematic diagram of a power supply system 3 according to an embodiment of the invention. As shown in FIG. 3A and FIG. 3B, the display apparatus 1 of the embodiment comprises a power supply system 3 and a display panel 32, and the power supply system 30 is similar to the two-times-voltage charging pump power supply system 2 shown in FIG. 2B and comprises a charging pump module 30, the amplifying module 22 and the load module 24 (i.e. an equivalent load circuit of the display panel 32). Preferably, the charging pump module 30 of the embodiment comprises a first charging pump circuit 300, a second charging pump circuit 302 and a control module 308. The first charging pump circuit 300 is coupled to a first flying capacitor set 304 in parallel, and comprises transistor switches M1_1-M1_4 being coupled to each other in series for forming a first transistor switch set, wherein drains of the transistor switches M1_1, M1_2 are coupled to sources of the transistor switches M1_2, M1_3, a drain of the transistor switch M13 is coupled to a drain of the transistor switch M1_4, a drain of the transistor switch M1_1 and a source of the transistor switch M1_2 are coupled to a terminal of the first flying capacitor set 304, and a drain of the transistor switch M1_3 and a drain of the transistor switch M1_4 are coupled to another terminal of the first flying capacitor set 304. The second charging pump circuit 302 is coupled to a second flying capacitor set 306 in parallel, and comprises transistor switches M2_1-M2_4 being coupled to each other in series for forming a second transistor switch set, wherein drains of the transistor switches M2_1, M2_2 are coupled to sources of the transistor switches M2_2, M2_3, a drain of the transistor switch M2_3 is coupled to a drain of the transistor switch M2_4, a drain of the transistor switch M2_1 and a source of the transistor switch M2_2 are coupled to a terminal of the second flying capacitor set 306, and a drain of the transistor switch M2_3 and a drain of the transistor switch M2_4 are coupled to another terminal of the second flying capacitor set 306. Also, the drain of the transistor switch M1_2, the source of the transistor switch M1_3, the drain of the transistor switch M2_2 and the source of the transistor switch M2_3 are coupled to a voltage source VDD.

Besides, the first charging pump circuit 300 and the second charging pump circuit 302 are coupled to the storage capacitor Cs in parallel, i.e. a source of the transistor switch M1_1 and a source of the transistor switch M2_1 are coupled to a terminal of the storage capacitor Cs, and a source of the transistor switch M1_4, a source of the transistor switch M2_4 and another terminal of the storage capacitor Cs are coupled to a ground. The first flying capacitor set 304 and the second flying capacitor set 306 are coupled to the control module 308, and the first flying capacitor set 304 comprises a plurality of first flying capacitor units C1_1-C1_n and the second flying capacitor set 306 comprises a plurality of second flying capacitor units C2_1-C2_n. Further, the source of the transistor switch M1_1 and the source of the transistor switch M2_1 are coupled a power source terminal of the amplifying module 22, an input terminal of the amplifying module 22 is utilized to receive a reference voltage Vref, and an output terminal of the amplifying module 22 is coupled to an input terminal of the load module 24 (i.e. the equivalent load circuit of the display panel 32) and another input terminal of the amplifying module 22. The equivalent load circuit of the load module 24 comprises a load resistor RL and a load capacitor CL, and the load resistor RL is coupled to the load capacitor CL in series and a terminal of the load capacitor CL is coupled to the ground. A resistance value of the load resistor RL and a capacitance value of the load capacitor CL are utilized to determine a period for achieving a predetermined voltage in a dynamic charging operation.

Noticeably, more than one of the flying capacitor units $C1\_1$-$C1\_n$ and $C2\_1$-$C2\_n$ are coupled to a plurality of switch units, such as an upper terminal and a lower terminal of the flying capacitor unit $C1\_2$ are coupled to switch units $SW1\_2U$ and $SW1\_2D$, respectively, an upper terminal and a lower terminal of the flying capacitor unit $C1\_n$ are coupled to switch units $SW1\_nU$ and $SW1\_nD$, respectively, an upper terminal and a lower terminal of the flying capacitor unit $C2\_2$ are coupled to switch units $SW2\_2U$ and $SW2\_2D$, respectively, and an upper terminal and a lower terminal of the flying capacitor unit $C2\_n$ are coupled to switch units $SW2\_nU$ and $SW2\_nD$, respectively. Accordingly, the control module 308 of the embodiment is operated to generate a plurality of control signals to turn on or turn off the switch units $SW1\_2U$-$SW1\_nU$ and $SW1\_2D$-$SW1\_nD$ of the first flying capacitor units $C1\_1$-$C1\_n$ and the switch units $SW2\_2U$-$SW2\_nU$ and $SW2\_2D$-$SW2\_nD$ of the second flying capacitor units $C2\_1$-$C2\_n$.

Under such circumstances, the control module 308 of the embodiment can utilize the control signals to turn on/off the flying capacitor units $C1\_1$-$C1\_n$ and $C2\_1$-$C2\_n$. In the meanwhile, the charging pump circuits 300 and 302 receive the conduction signals KA, KB, XA and XB, as shown in FIG. 2B, to adaptively turn on/off conductions of the transistor switches $M1\_1$-$M1\_4$ and $M2\_1$-$M2\_4$. Further, the voltage source VDD of the embodiment can process a charging operation for the flying capacitor units $C1\_1$-$C1\_n$ and $C2\_1$-$C2\_n$, and via the plurality of control signals and the conduction signals XA and XB, the turned-on flying capacitor units $C1\_1$-$C1\_n$ and $C2\_1$-$C2\_n$ are operated to generate a charging voltage VS, so as to output the charging voltage VS to the amplifying module 22. Next, the amplifying module 22 is operated to utilize the charging voltage VS as the voltage source and to refer to the reference voltage Vref, so as to generate the amplifying voltage Vout to be transmitted to the load module 24. Accordingly, the load module 24 processes the dynamic charging operation in the predetermined period according to the amplifying voltage Vout, i.e. utilizing the amplifying voltage Vout to process the dynamic charging operation for the equivalent resistor-capacitor circuit of the load module 24, to make the load module 24 achieve a predetermined voltage within a predetermined period, so as to driving the display panel in the display apparatus 3 for the display operation.

In other words, the charging pump module 30 of the embodiment processes the dynamic charging operation within the predetermined period to have the control module 308 control the connection relationships corresponding to the switch units $SW1\_2U$-$SW1\_nU$ and $SW1\_2D$-$SW1\_nD$ of the first flying capacitor units $C1\_1$-$C1\_n$ and the switch units $SW2\_2U$-$SW2\_nU$ and $SW2\_2D$-$SW2\_nD$ of the second flying capacitor units $C2\_1$-$C2\_n$ via the plurality of control signals, so as to turn on/off different numbers of the first flying capacitor units $C1\_1$-$C1\_n$ and the second flying capacitor units $C2\_1$-$C2\_n$, such that the charged flying capacitor units $C1\_1$-$C1\_n$ and $C2\_1$-$C2\_n$ are operated to generate the charging voltage VS, so as to have the charging pump module 30 correspondingly generate the charging voltage source with adjustable values for shortening the charging period thereof.

Figure 4:
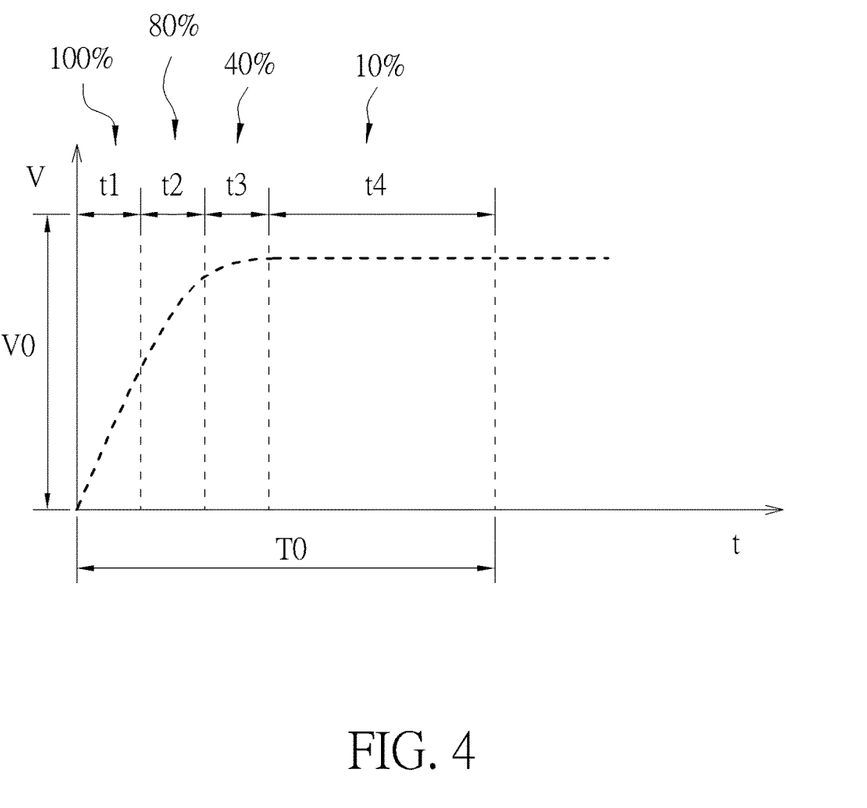
FIG. 4 illustrates a schematic diagram of a charging period and a completion voltage corresponding to the charging pump module in FIG. 3.

Please refer to FIG. 4, which illustrates a schematic diagram of a charging period T0 and a completion voltage V0 corresponding to the charging pump module 30 in FIG. 3, wherein the charging period T0 can be divided into four charging durations t1, t2, t3 and t4. In the embodiment, during the charging duration t1, since the predetermine voltage is initially charged from zero, the charging pump module 30 can turn on all the flying capacitor units $C1\_1$-$C1\_n$ and $C2\_1$-$C2\_n$ to provide the maximum charging capability. During the charging duration t2, since the predetermined voltage has been elevated, the charging pump module 30 can turn on 80% the number of the flying capacitor units $C1\_1$-$C1\_n$ and $C2\_1$-$C2\_n$ to maintain most of the flying capacitor units being operated to process the charging operation and turn off few flying capacitor units for power saving. During the charging duration t3, since the predetermined voltage is closed to the completion voltage V0, the charging pump module 30 can turn on 40% the number of the flying capacitor units $C1\_1$-$C1\_n$ and $C2\_1$-$C2\_n$ to adaptively reduce the utilization number of the flying capacitor unit. During the charging duration t4, since the predetermined voltage equals the completion voltage V0, the charging pump module 30 can turn on only 10% the number of the flying capacitor units $C1\_1$-$C1\_n$ and $C2\_1$-$C2\_n$ and turn off most of the flying capacitor units for effectively reducing the power consumption. Certainly, the utilization number of the flying capacitor units in the embodiment is only for demonstration, and those skilled in the art can adaptively adjust or modify the turned-on/turned-off number of the flying capacitor unit according to different practical requirements, which is not limiting the scope of the invention.

Accordingly, the charging pump module 30 and the control module 308 of the embodiment are operated to turn on more (or all) flying capacitor units at an initiation period (such as the charging duration t1) of the predetermined period, wherein the number of the turned-on flying capacitor units corresponds to a first sum number at the initiation period, and to turn on fewer flying capacitor units at a completion period (such as the charging duration t3) of the predetermined period, wherein the number of the turned-on flying capacitor units corresponds to a second sum number at the completion period, such that the first sum number of the turned-on first flying capacitor units $C1\_1$-$C1\_n$ and/or the turned-on second flying capacitor units $C2\_1$-$C2\_n$ at the initiation period is larger than the second sum number of the turned-on first flying capacitor units $C1\_1$-$C1\_n$ and/or the turned-on second flying capacitor units $C2\_1$-$C2\_n$ at the completion period, to accomplish the purpose of energy saving by adaptively adjust the utilization number of the flying capacitor units. In other words, if the initiation period corresponds to a first voltage value (e.g. the amplifying voltage Vout outputted by the amplifying module 22) and the completion period corresponds to a second voltage value, the first voltage value is smaller than the second voltage value during the dynamic charging operation, and a first tangent slope corresponding to the first voltage value is larger than a second tangent slope corresponding to the second voltage value, i.e. the embodiment of the invention can dynamically reduce the utilization number of the flying capacitor units according to whether a tangent slope is gradually decreased.

Figure 5:
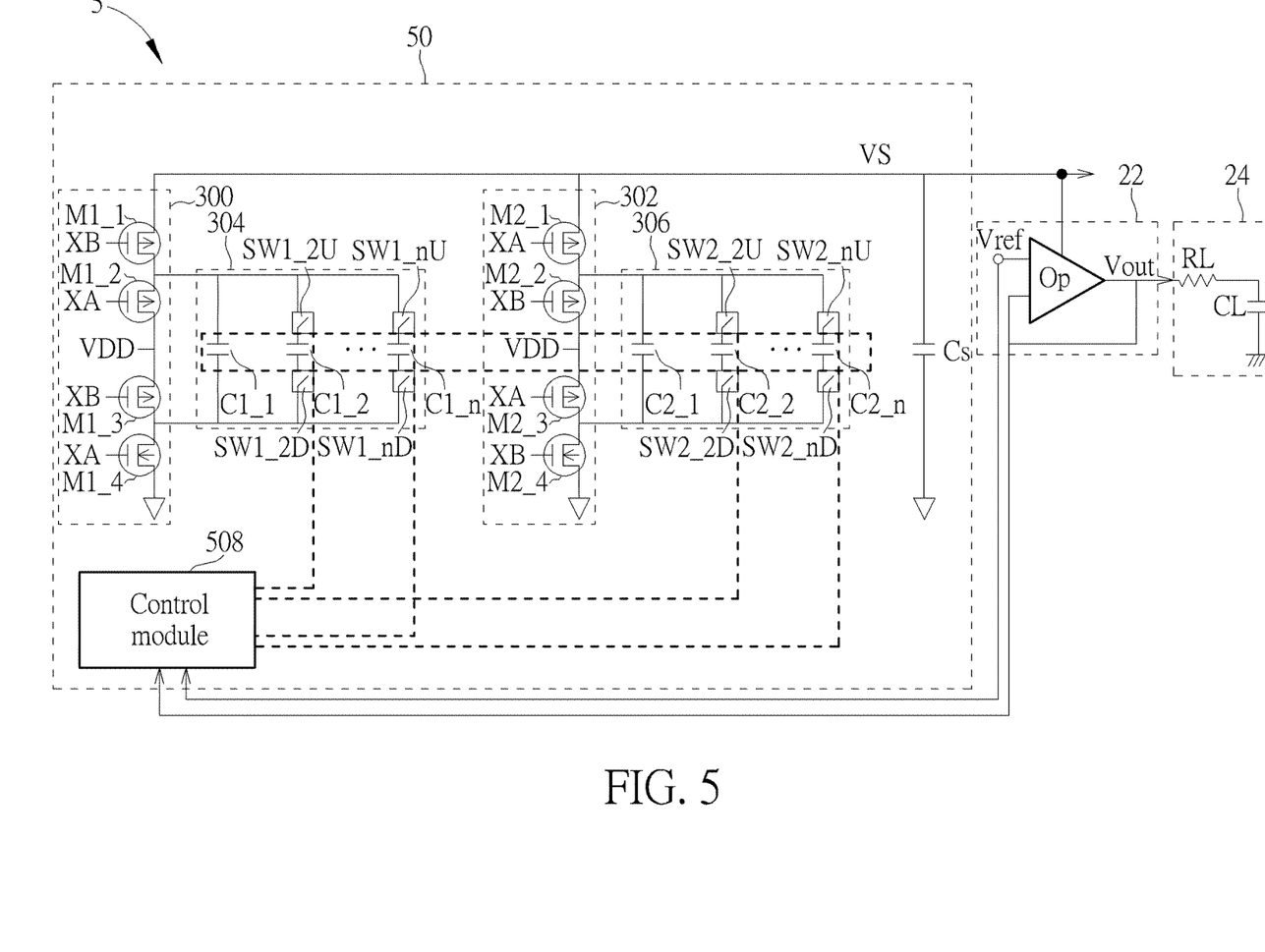
FIG. 5 illustrates a schematic diagram of another power supply system according to an embodiment of the invention.

Please refer to FIG. 5, which illustrates a schematic diagram of another power supply system 5 according to an embodiment of the invention. In comparison with the power supply system 3 shown in FIG. 3B, the power supply system 5 also comprises the similar composition elements and operations thereof of the power supply system 3. The only difference is that the power supply system 5 comprises the control module 508 to be operated as an analogy control module and an input terminal of the control module 508 is coupled to the amplifying module 22 to receive the reference voltage Vref and the amplifying voltage Vout. Further, the control module 580 can output a plurality of control signals to turn on or turn off the flying capacitor units C1_1-C1_$n$ and C2_1-C2_$n$ according to a difference between the reference voltage Vref and the amplifying voltage Vout. In other words, the power supply system 5 of the embodiment has the control module 508 to adaptively compare the difference between the reference voltage Vref and the amplifying voltage Vout, so as to dynamically monitor the values of the amplifying voltage Vout and to make sure that whether the amplifying voltage Vout is larger enough to finish the dynamic charging operation. Accordingly, the plurality of control signals are adaptively outputted to precisely turn on/off the utilization number of the flying capacitor units C1_1-C1_$n$ and C2_1-C2_$n$ for reducing the power consumption and turning off unnecessary flying capacitor units.

Figure 6:
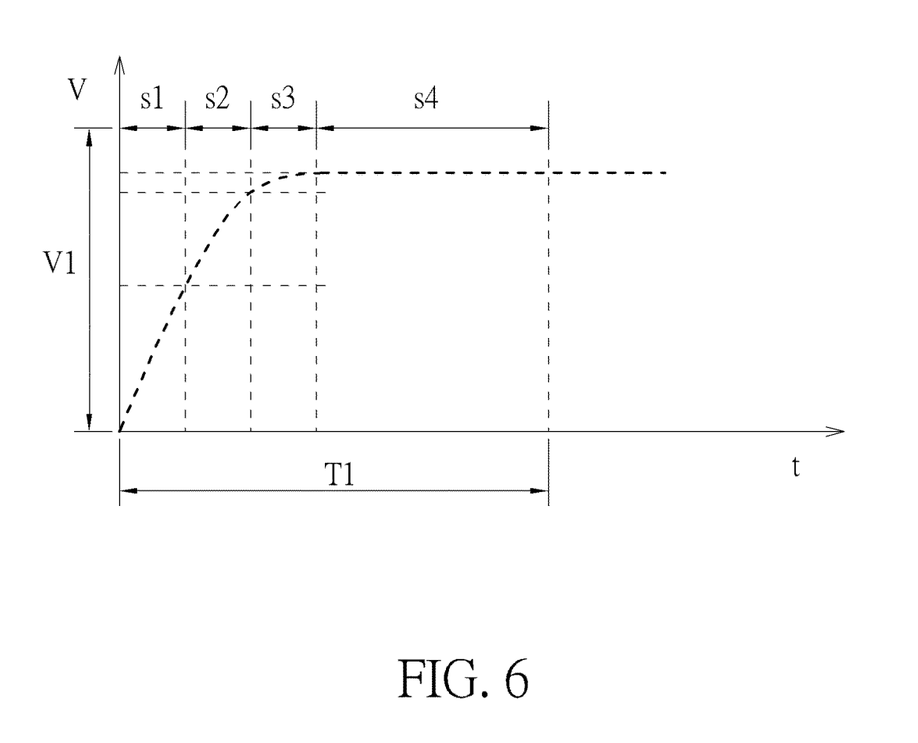
FIG. 6 illustrates a schematic diagram of a charging period and a completion voltage corresponding to the charging pump module in FIG. 5.

Please refer to FIG. 6, which illustrates a schematic diagram of a charging period T1 and a completion voltage V1 corresponding to the charging pump module 50 in FIG. 5, wherein the charging period T1 can be divided into four charging durations s1, s2, s3 and s4. As shown in FIG. 6, during the charging duration s1, since the control module 508 can monitor or detect that there is a maximum difference between the reference voltage Vref and the amplifying voltage Vout, the control module 508 can control the charging pump module 30 to turn on all the flying capacitor units C1_1-C1_$n$ and C2_1-C2_$n$ for providing the maximum charging capability. During the charging duration s2, since the control module 508 can monitor or detect the difference between the reference voltage Vref and the amplifying voltage Vout being gradually reduced, the control module 508 can control the charging pump module 30 to turn on 80% the number of the flying capacitor units C1_1-C1_$n$ and C2_1-C2_$n$, so as to maintain most of the flying capacitor units being operated to process the charging operation. During the charging duration s3, since the control module 508 can monitor or detect that the amplifying voltage Vout is closed to the reference voltage Vref (i.e. the predetermined voltage is closed to be the completion voltage V1), the control module 508 can control charging pump module 30 to turn on 40% the number of the flying capacitor units C1_1-C1_$n$ and C2_1-C2_$n$, so as to adaptively reduce the utilization number of the flying capacitor units. During the charging duration s4, since the control module 508 can monitor or detect that the difference between the reference voltage Vref and the amplifying voltage Vout is closed to zero (i.e. the dynamic charging operation has been completed), the control module 508 can control the charging pump module 30 to turn on only 10% the number of the flying capacitor units C1_1-C1_$n$ and C2_1-C2_$n$ and to turn off most of the flying capacitor units for effectively reducing the power consumption. Certainly, the utilization number of the flying capacitor units in the embodiment is only for demonstration, and those skilled in the art can adaptively adjust or modify the turned-on/turned-off number of the flying capacitor unit according to different practical requirements, which is not limiting the scope of the invention.

Figure 7:
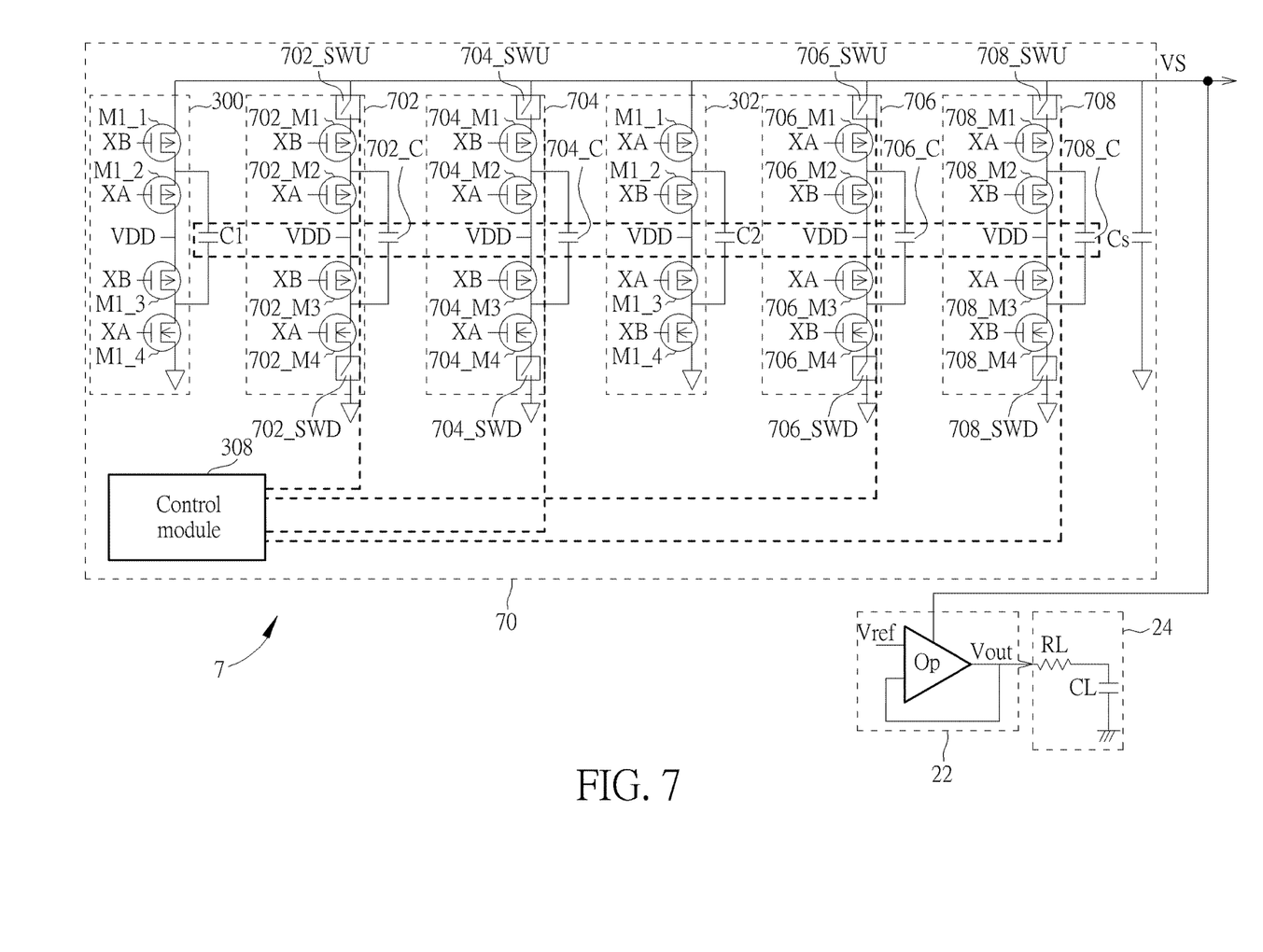
FIG. 7 illustrates a schematic diagram of another power supply system according to an embodiment of the invention.

Please refer to FIG. 7, which illustrates a schematic diagram of another power supply system 7 according to an embodiment of the invention. In comparison with the power supply system. 3 shown in FIG. 3B, the power supply system 7 comprises the first charging pump circuit 300, the second charging pump circuit 302, the storage capacitor Cs and the control module 308, and also comprises charging pump circuits 702, 704, 706 and 708, wherein the number of the charging pump circuits herein is only for demonstration, and is not limiting the scope of the invention. Further, each of the charging pump circuits 702, 704, 706 and 708 is similar to the charging pump circuit 300 or 302, and the charging pump circuits 702, 704, 706 and 708 comprise transistor switches 702_M1-702_M4, 704_M1-704_M4, 706_M1-706_M4 and 708_M1-708_M4, respectively, to receive the conduction signals XA and XB for switching the conduction relationships of the transistor switches 702_M1-702_M4, 704_M1-704_M4, 706_M1-706_M4 and 708_M1-708_M4. Besides, one upper terminal of the charging pump circuits 702, 704, 706, 708 can be coupled to switch units 702_SWU, 704_SWU, 706_SWU, 708_SWU in series, respectively, and can be coupled to the charging pump circuits 300, 302 in parallel. Also, one lower terminal of the charging pump circuits 702, 704, 706, 708 can be coupled to switch units 702_SWD, 704_SWD, 706_SWD, 708_SWD in series, respectively, and another terminal of the switch units 702_SWD, 704_SWD, 706_SWD, 708_SWD is coupled to the ground. In comparison with the charging pump circuits 300 and 302 being coupled to the flying capacitor units C1 and C2 in parallel, respectively, each of the charging pump circuits 702, 704, 706, 708 in the embodiment is coupled to the flying capacitor units 702_C, 704_C, 706_C, 708_C in parallel, respectively.

Accordingly, the control module 308 of the embodiment can correspondingly output the control signals to turn on or turn off the switch units 702_SWU, 704_SWU, 706_SWU, 708_SWU, 702_SWD, 704_SWD, 706_SWD and 708_SWD, so as to adaptively conduct the charging pump circuits 702, 704, 706 and 708 for controlling a current value corresponding to the charging voltage VS outputted by the charging pump module 70. The related schematic diagram illustrating the charging period versus the completion voltage of the charging pump module 70 can refer to the demonstration shown in FIG. 4, such that the flying capacitor units C1, C2, 702_C, 704_C, 706_C and 708_C can be correspondingly turned on or turned off according to changes of the charging voltage in different periods, to provide different utilization numbers of the flying capacitor units, so as to adaptively shorten the charging period for achieving the purpose of energy saving. The detailed operations of power supply system 7 are not described herein for brevity.

Figure 8:
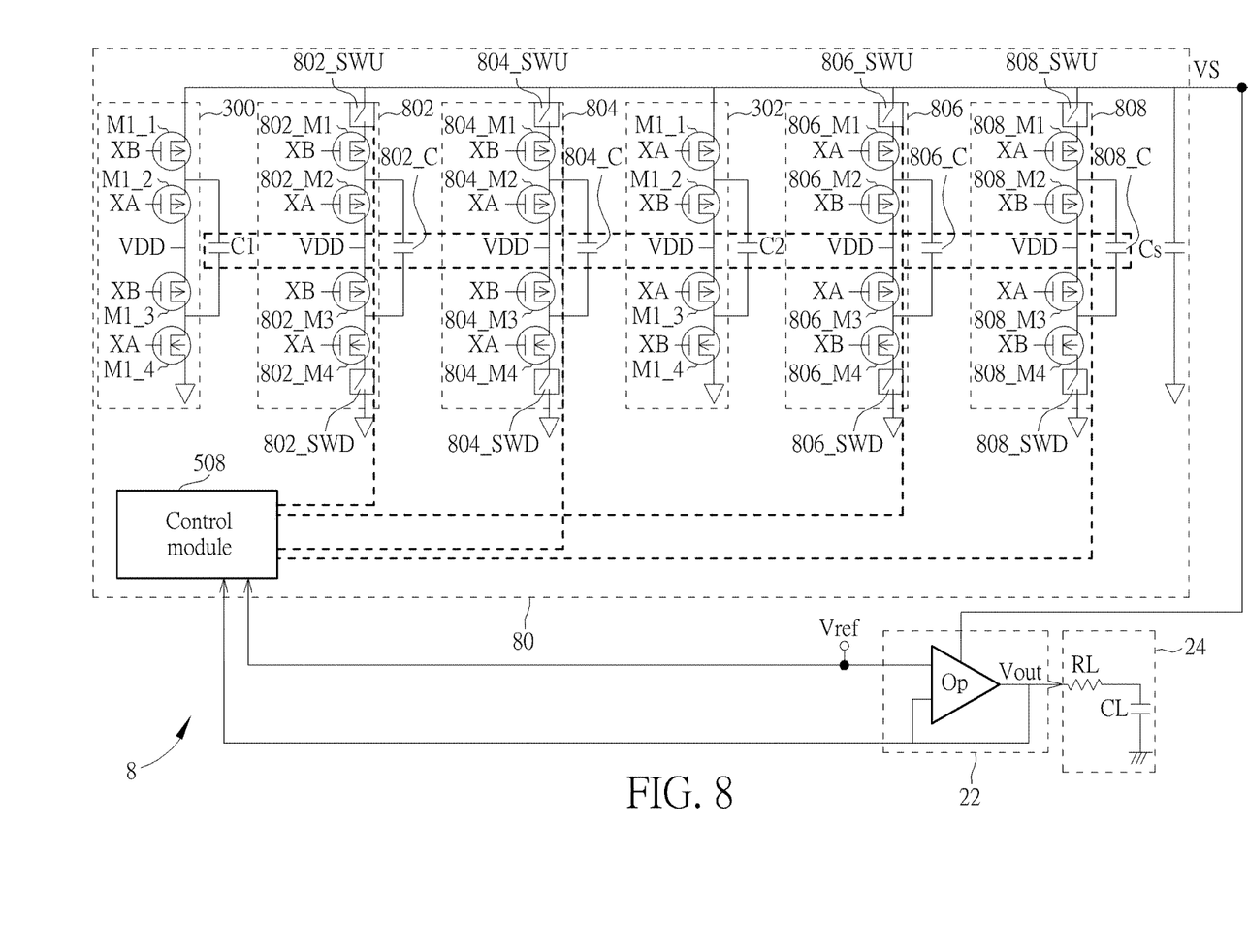
FIG. 8 illustrates a schematic diagram of another power supply system according to an embodiment of the invention.

Please refer to FIG. 8, which illustrates a schematic diagram of another power supply system 8 according to an embodiment of the invention. In comparison with the power supply system 5 shown in FIG. 5, the power supply system 8 comprises the first charging pump circuit 300, the second charging pump circuit 302, the storage capacitor Cs and the control module 508, and also comprises charging pump circuits 802, 804, 806 and 808, wherein the number of the charging pump circuits is only for demonstration, and is not limiting the scope of the invention. Further, each of the charging pump circuits 802, 804, 806 and 808 is similar to the charging pump circuit 300 or 302, and the charging pump circuits 802, 804, 806 and 808 comprise transistor switches 802_M1-802_M4, 804_M1-804_M4, 806_M1-806_M4 and 808_M1-808_M4, respectively, to receive the conduction signals XA and XB for switching the conduction relationships of the transistor switches 802_M1-802_M4, 804_M1-804_M4, 806_M1-806_M4 and 808_M1-808_M4. Besides, one upper terminal of the charging pump circuits 802, 804, 806, 808 can be coupled to switch units 802_SWU, 804_SWU, 806_SWU, 808_SWU in series, respectively, and can be coupled to the charging pump circuits 300, 302 in parallel. Also, one lower terminal of the charging pump circuits 802, 804, 806, 808 can be coupled to switch units 802_SWD, 804_SWD, 806_SWD, 808_SWD in series, respectively, and another terminal of the switch units 802_SWD, 804_SWD, 806_SWD, 808_SWD is coupled to the ground. In comparison with the charging pump circuits 300 and 302 being coupled to the flying capacitor units C1 and C2 in parallel, respectively, each of the charging pump circuits 802, 804, 806, 808 in the embodiment is coupled to the flying capacitor units 802_C, 804_C, 806_C, 808_C in parallel, respectively.

Accordingly, the control module 508 of the embodiment is coupled to the amplifying module (not shown in the figure) to receive the reference voltage Vref and amplifying voltage Vout, and can correspondingly output the control signals to turn on or turn off the switch units 802_SWU, 804_SWU, 806_SWU, 808_SWU, 802_SWD, 804_SWD, 806_SWD and 808_SWD, so as to adaptively conduct the charging pump circuits 802, 804, 806 and 808 for controlling a current value corresponding to the charging voltage VS outputted by the charging pump module 80. The related schematic diagram illustrating the charging period versus the completion voltage of the charging pump module 80 can refer to the demonstration shown in FIG. 6, such that the flying capacitor units C1, C2, 802_C, 804_C, 806_C and 808_C can be correspondingly turned on or turned off according to the difference between the reference voltage Vref and the amplifying voltage Vout in different periods, to provide different utilization numbers of the flying capacitor units, so as to adaptively shorten the charging period for achieving the purpose of energy saving. The detailed operations of power supply system 8 are not described herein for brevity.

In comparison with the prior art which has the flying capacitor unit with the fixed capacitance value in the power supply system to restrict the adjustment of the charging period versus the charging voltage being processed by elevating/lowering the clock signal clk, the embodiment of the invention provides the charging pump module to be adaptively combined with the control module and multiple charging pump circuits, and each charging pump circuit comprises at least one flying capacitor unit and one switch unit. Accordingly, the control module can control the turned-on/turned-off number of the flying capacitor units according to different charging periods, or can compare the difference between the amplifying voltage and the reference voltage to adaptively turn on or turn off the flying capacitor units. In other words, the embodiment of the invention can adaptively adjust or modify the utilization number of the flying capacitor units at different charging periods, to make the charging pump module output the charging current corresponding to the charging voltage without being too large or too small, such that the charging pump module can provide the predetermined charging voltage to charge the display apparatus in the shortest charging period, so as to effectively reduce the power consumption. Certainly, those skilled in the art can adaptively modify, adjust or change the operational mechanisms or circuit designs of these charging pump modules, to have the flying capacitor units be adaptively turned on or turned off, so as to correspondingly adjust the values of the charging current and charging period, which is also within the scope of the invention.

To sum up, the embodiments of the invention provide the charging pump module comprising the control module and multiple charging pump circuits, and each charging pump circuit comprises at least one flying capacitor unit and one switch unit. Accordingly, the control module can refer to the charging periods or compare the difference between the amplifying voltage and the reference voltage, to control the utilization number of the flying capacitor units, so as to have the charging pump module output the adjustable charging current value and utilize the proper charging current for the charging operation, which can elevate the application range of the charging pump module applied onto the display apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply system, comprising:
   a charging pump module, comprising:
      a first charging pump circuit, coupled to a first flying capacitor set in parallel and comprising a first transistor switch set, wherein the first flying capacitor set comprises a plurality of first flying capacitor units coupled to each other in parallel;
      a second charging pump circuit, coupled to a second flying capacitor set in parallel and comprising a second transistor switch set, wherein the second flying capacitor set comprises a plurality of second flying capacitor units coupled to each other in parallel; and
      a control module, coupled to the first flying capacitor set and the second flying capacitor set, for generating a plurality of control signals to switch a connection relationships of the plurality of first flying capacitor units and the plurality of second flying capacitor units;
      wherein the first charging pump circuit and the second charging pump circuit process a charging operation for the plurality of first flying capacitor units and the plurality of second flying capacitor units according to a plurality of conduction signals, to generate a charging voltage according to the connection relationships of the plurality of first flying capacitor units and the plurality of second flying capacitor units;
   an amplifying module, coupled to the charging pump module, for utilizing the charging voltage as a voltage source to generate an amplifying voltage; and
   a load module, coupled to the amplifying module, for processing a dynamic charging operation in a predetermined period according to the amplifying voltage, to make the load module achieve a predetermined voltage.

2. The power supply system of claim 1, wherein the first transistor switch set comprises a first transistor switch, a second transistor switch, a third transistor switch and a fourth transistor switch, a drain of the first transistor switch and a source of the second transistor switch are coupled together to a terminal of the first flying capacitor set, and a drain of the third transistor switch and a drain of the fourth transistor switch are coupled together to another terminal of the first flying capacitor set, such that the first flying capacitor set and the first charging pump circuit are coupled in parallel and a source of the first transistor switch is coupled to the second charging pump circuit and a storage capacitor.

3. The power supply system of claim 1, wherein the second transistor switch set comprises a fifth transistor switch, a sixth transistor switch, a seventh transistor switch and a eighth transistor switch, a drain of the fifth transistor switch and a source of the sixth transistor switch are coupled together to a terminal of the second flying capacitor set, and a drain of the seventh transistor switch and a drain of the eighth transistor switch are coupled together to another terminal of the second flying capacitor set, such that the second flying capacitor set and the second charging pump circuit are coupled in parallel and a source of the fifth transistor switch is coupled to the first charging pump circuit and a storage capacitor.

4. The power supply system of claim 1, wherein at least one of the plurality of first flying capacitor units and the plurality of second flying capacitor units is coupled to a switch unit, and the dynamic charging operation is operated to have the control module control the at least one switch unit of the plurality of first flying capacitor units and the plurality of second flying capacitor units within the predetermine period via the plurality of control signals, so as to turn on or turn off different numbers of the plurality of first flying capacitor units and the plurality of second flying capacitor units for generating different values of the charging voltage, which corresponds to a charging current with an adjustable value.

5. The power supply system of claim 4, wherein at an initiation period of the predetermined period, a number of the turned-on first flying capacitor units and a number of the turned-on second flying capacitor units are added to be a first sum number; at an termination period of the predetermined period, a number of the turned-on first flying capacitor units and a number of the turned-on second flying capacitor units are added to be a second sum number, and the first sum number is larger than the second sum number.

6. The power supply system of claim 5, wherein the initiation period corresponds to a first voltage value and the termination period corresponds to a second voltage value, and the first voltage value is smaller than the second voltage value and a first tangent slope corresponding to the first voltage value is larger than a second tangent slope corresponding to the second voltage value.

7. The power supply system of claim 1, wherein the load module comprises a load resistor and a load capacitor, and a resistance value of the load resistor and a capacitance value of the load capacitor are utilized to determine a period for achieving the predetermined voltage.

8. The power supply system of claim 1, wherein the control module is coupled to the amplifying module to receive a reference voltage and the amplifying voltage, so as to correspondingly output the plurality of control signals according to a difference between the reference voltage and the amplifying voltage for turning on or turning off the plurality of first flying capacitor units and the plurality of second flying capacitor units.

9. The power supply system of claim 1, wherein the charging pump module is further coupled to at least one third charging pump circuit, which comprises a plurality of transistor switches, and is coupled to a third flying capacitor unit in parallel and is coupled to a switch unit in series, and the control module is operated to utilize one of the plurality of control signals for turning on or turning off the switch unit, such that the third flying capacitor unit correspondingly generates another charging voltage to be transmitted to the load module according to the plurality of conduction signals and a conduction way of the switch unit.

10. The power supply system of claim 1, wherein the charging pump module is further coupled to at least one fourth charging pump circuit, which comprises a plurality of transistor switches, and is coupled to a fourth flying capacitor unit in parallel and is coupled to a switch unit in series, and the control module is coupled to the amplifying module to receive a reference voltage and the amplifying voltage, so as to output one of the control signals to the switch unit according to a difference between the reference voltage and the amplifying voltage, such that the fourth flying capacitor unit correspondingly generates another charging voltage to be transmitted to the load module according to the plurality of conduction signals and a conduction way of the switch unit.

11. A display apparatus, comprising:
a display panel, comprising an equivalent load resistor and an equivalent load capacitor; and
a power supply system, coupled to the equivalent load resistor and the equivalent load capacitor of the display panel, the power supply system comprising:
a charging pump module, comprising:
a first charging pump circuit, coupled to a first flying capacitor set in parallel and comprising a first transistor switch set, wherein the first flying capacitor set comprises a plurality of first flying capacitor units coupled to each other in parallel;
a second charging pump circuit, coupled to a second flying capacitor set in parallel and comprising a second transistor switch set, wherein the second flying capacitor set comprises a plurality of second flying capacitor units coupled to each other in parallel; and
a control module, coupled to the first flying capacitor set and the second flying capacitor set, for generating a plurality of control signals to switch a connection relationships of the plurality of first flying capacitor units and the plurality of second flying capacitor units;
wherein the first charging pump circuit and the second charging pump circuit process a charging operation for the plurality of first flying capacitor units and the plurality of second flying capacitor units according to a plurality of conduction signals, to generate a charging voltage according to the connection relationships of the plurality of first flying capacitor units and the plurality of second flying capacitor units; and
an amplifying module, coupled to the charging pump module, for utilizing the charging voltage as a voltage source to generate an amplifying voltage;
wherein the power supply system processes a dynamic charging operation in a predetermined period according to the amplifying voltage, to make the display panel achieve a predetermined voltage for initiating a display operation.

* * * * *